(12) United States Patent
Ianev et al.

(10) Patent No.: US 10,979,886 B2
(45) Date of Patent: Apr. 13, 2021

(54) UE CONFIGURATION AND UPDATE WITH NETWORK SLICE SELECTION POLICY

(71) Applicant: NEC Corporation, Tokyo (JP)

(72) Inventors: Iskren Ianev, Heidelberg (DE); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/324,864

(22) PCT Filed: Oct. 9, 2018

(86) PCT No.: PCT/JP2018/037616
§ 371 (c)(1),
(2) Date: Feb. 11, 2019

(87) PCT Pub. No.: WO2019/073977
PCT Pub. Date: Apr. 18, 2019

(65) Prior Publication Data
US 2020/0196130 A1    Jun. 18, 2020

(30) Foreign Application Priority Data
Oct. 11, 2017  (EP) .................................... 17196037

(51) Int. Cl.
*H04W 8/02*    (2009.01)
(52) U.S. Cl.
CPC .................... *H04W 8/02* (2013.01)
(58) Field of Classification Search
CPC ..... H04W 48/08; H04W 48/18; H04W 60/00; H04W 8/08; H04W 60/04; H04W 80/10; H04W 12/06; H04W 48/14; H04W 4/70; H04W 60/06; H04W 76/11; H04W 76/12; H04W 76/18; H04W 76/27; H04W 84/042; H04W 8/02; H04W 16/18; H04W 24/02; H04W 24/10; H04W 28/24; H04W 36/0027; H04W 36/0033; H04W 36/00835; H04W 36/06; H04W 36/14; H04W 36/385; H04W 48/16; H04W 48/17; H04W 48/20; H04W 52/0216; H04W 52/0229; H04W 52/0254; H04W 68/005; H04W 72/02; H04W 76/14; H04W 76/25; H04W 76/28; H04W 80/08; H04W 88/023;
(Continued)

(56) References Cited

U.S. PATENT DOCUMENTS

2018/0324576 A1* 11/2018 Salkintzis ............. H04W 48/14
2018/0332523 A1* 11/2018 Faccin ............. H04W 36/0033
(Continued)

OTHER PUBLICATIONS

International Search Report and The Written Opinion of the International Searching Authority dated Jan. 22, 2019, in corresponding PCT International Application.
(Continued)

*Primary Examiner* — Nathan S Taylor
(74) *Attorney, Agent, or Firm* — Finnegan, Henderson, Farabow, Garrett & Dunner, L.L.P.

(57) ABSTRACT

A policy control function, PCF, node, comprising: transmitting means for transmitting a message related to information for updating policies of at least one of User Equipment, UE, access and Protocol Data Unit, PDU, Session selection, to a UE via an Access and Mobility Management Function, AMF node.

20 Claims, 9 Drawing Sheets

(58) Field of Classification Search
CPC ..... H04W 88/06; H04W 88/14; H04W 8/065; H04W 8/12; H04W 8/22; H04W 8/245; H04W 8/26; H04W 36/00; H04W 36/38; H04W 48/00; H04W 68/00; H04W 88/02; H04W 48/01
See application file for complete search history.

(56) References Cited

U.S. PATENT DOCUMENTS

| | | | |
|---|---|---|---|
| 2019/0029065 A1* | 1/2019 | Park | H04W 60/06 |
| 2019/0174405 A1* | 6/2019 | Yang | H04W 60/00 |
| 2019/0261159 A1* | 8/2019 | Wang | H04W 48/16 |
| 2019/0357129 A1* | 11/2019 | Park | H04W 88/14 |
| 2019/0364541 A1* | 11/2019 | Ryu | H04W 72/02 |
| 2019/0373441 A1* | 12/2019 | Ryu | H04W 24/02 |
| 2020/0137552 A1* | 4/2020 | Park | H04W 76/18 |
| 2020/0187106 A1* | 6/2020 | Salkintzis | H04W 48/00 |

OTHER PUBLICATIONS

3GPP TS 23.501 V1.4.0 (Sep. 2017), "3$^{rd}$ Generation Partnership Project; Technical Specification Group Services and System Aspects; System Architecture for the 5G System, Stage 2, (Release 15)", pp. 1-151, (Sep. 2017).

3GPP TS 23.502 V1.2.0 (Sep. 2017), "3$^{rd}$ Generation Partnership Project; Technical Specification Group Services and System Aspects; Procedures for the 5G System, Stage 2, (Release 15)", pp. 1-165, (Sep. 2017).

Motorola Mobility et al., "Application Function Influence on Slice Selection", SA WG2 Meeting #122bis, S2-175862, pp. 1-5, (Aug. 2017).

Samsung, "TS 23.502—PCF Initiated UE Policy Update Procedure", SA WG2 Meeting #S2-120, S2-171943, pp. 1-2, (Mar. 2017).

LG Electronics et al., "TS 23.502: Updates to Generic UE Configuration Update Procedure", SA WG2 Meeting #122, S2-174420, pp. 1-4, (Jun. 2017).

* cited by examiner

General block diagram for UE

General block diagram for AMF

General block diagram for PCF

General block diagram for UDR

UE CONFIGURATION AND UPDATE WITH NETWORK SLICE SELECTION POLICY

CROSS-REFERENCE TO RELATED PATENT APPLICATIONS

This application is a National Stage Entry of International Application No. PCT/JP2018/037616, filed Oct. 9, 2018, which claims priority from European Patent Application No. 17196037.0, filed Oct. 11, 2017. The entire contents of the above-referenced applications are expressly incorporated herein by reference.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to configuring user equipment with applicable network slice selection policy in the so-called 'Next Generation' systems.

BACKGROUND ART

3GPP is currently specifying the next generation of a mobile architecture, denoted as 'NextGen' or 5th generation (5G) architecture. One of the main key issues for NextGen networks is to allow for Network Slicing that enables the operators to create networks customized to provide optimized solutions for different market scenarios which demands diverse requirements.

The following Network Slicing definitions and principles have been agreed in Non-Patent Literature 1 V1.4.0 and Non-Patent Literature 2 V1.2.0 (listed in non-alphabetical order):

S-NSSAI—An S-NSSAI (Single Network Slice Selection Assistance information) identifies a Network Slice.
S-NSSAI is comprised of;
   A Slice/Service type (SST), which refers to the expected Network Slice behavior in terms of features and services;
   A Slice Differentiator (SD). which is optional information that complements the Slice/Service type(s) to allow further differentiation for selecting a Network Slice instance from the potentially multiple Network Slice instances that all comply with the indicated Slice/Service type. This information is referred to as SD.
S-NSSAI scope—The S-NSSAI can have standard values or PLMN (Public Land Mobile Network) specific values. S-NSSAIs with PLMN-specific values are associated to the PLMN ID of PLMN that assigns it. An S-NSSAI shall not be used by the UE (User Equipment) in access stratum procedures in any PLMN other than the one to which the S-NSSAI is associated.
NSSAI—The Network Slice Selection Assistance Information is a collection of S-NSSAIs.
Allowed NSSAI—an NSSAI provided by the serving PLMN during e.g. a registration procedure, indicating the NSSAI allowed by the network for the UE in the serving PLMN for the current registration area. For each PLMN, the UE shall store the Configured NSSAI and, if any, the Allowed NSSAI. When the UE receives an Allowed NSSAI for a PLMN, the UE shall store the received Allowed NSSAI and override any previously stored Allowed NSSAI for this PLMN.
Configured NSSAI—an NSSAI that has been provisioned in the UE. A UE can be configured by the HPLMN (Home Public Land Mobile Network) with a Configured NSSAI per PLMN. A Configured NSSAI can be PLAIN-specific and the HPLMN indicates to what PLMN(s) each Configured NSSAI applies, including whether the Configured NSSAI applies to all PLMNs, i.e., the Configured NSSAI conveys the same information regardless of the PLMN the UE is accessing (e.g. this could be possible for NSSAIs containing only standardized S-NSSAIs).
Requested NSSAI—may be either:
   the Configured-NSSAI, or a subset thereof as described below, if the UE has no Allowed NSSAI for the current PLAIN; or
   the Allowed-NSSAI, or a subset thereof as described below, if the UE has an Allowed NSSAI for the current PLAIN, or
   the Allowed-NSSAI, or a subset thereof as described below, plus one or more S-NSSAIs from the Configured-NSSAI for which no corresponding S-NSSAI is present in the Allowed NSSAI and that were not previously permanently rejected (as defined below) by the network for the present tracking area.
Network Slice—A logical network that provides specific network capabilities and network characteristics.
Network Slice instance—A set of Network Function instances and the required resources (e.g. computer, storage and networking resources) which form a deployed Network Slice.
NSSP—Network Slice Selection Policy. The network operator may provision the UE with NSSP. The NSSP includes one or more NSSP rules each one associating an application with a certain S-NSSAI.

The contents of Non-Patent Literature 1 and Non-Patent Literature 2 are incorporated herein by reference.

The network operator (HPLMN (Home Public Land Mobile Network)) may provision the UE with Network Slice Selection Policy (NSSP). The NSSP includes one or more NSSP rules each one associating an application with a certain S-NSSAI. A default rule which matches all applications to a S-NSSAI may also be included. The UE shall store the NSSP until a new NSSP is provided to the UE by the HPLMN (Non-Patent Literature 1, 5.15.5.3).

At UE context establishment during registration, the AMF (Access and Mobility Management Function) is provided with the NSSP by the PCF (Policy Control Function) via the Npcf_AMPolicyControl_Get operation (Non-Patent Literature 2, s4.16.1.2). FIG. 1 illustrates further details of the UE Context Establishment during registration.

This procedure concerns both roaming and non-roaming scenarios.

In the non-roaming case the V-PCF is not involved:
1. The AMF decides to establish UE Context with the PCF during registration procedure.
2. The AMF sends Npcf_AMPolicyControl_Get to the PCF to retrieve the access and mobility control policy. The request includes the following information: UE Identity (SUPI (Subscriber Permanent Identifier)), subscription notification indication and, if available, Service Area Restrictions, and RFSP (RAT/Frequency Selection Priority) index which are retrieved from the UDM (Unified Data Management) during the update location procedure, and may include access type and RAT (Radio Access Technology)

type, PEI (Permanent Equipment Identifier), ULI (User Location Information), UE time zone, and service network information.

3. The H-PCF gets policy subscription related information if not available from the UDR (Unified Data Repository) using Nudr_User_Data_Management query service operation and makes a policy decision. Then the H-PCF responds to the Npcf_AMPolicyControl_Get service operation, and provides AMC (Adaptive Modulation and Coding) Rules and UE Policy, to the AMF. The acknowledgement includes the following information: Service Area Restrictions, RFSP Index, UE Policy (e.g. NSSP, SSCMSP (Session and Service Continuity Mode Selection Policy), DNN (Data Network Name) Selection Policy).

4. The AMF deploys the access and mobility control policy, which includes storing the Service Area Restrictions, provisioning the UE Policy and Service Area Restrictions to the UE and provisioning the RFSP index and Service Area Restrictions to the RAN (Radio Access Network).

The UE uses UE Configuration (e.g. NSSP) to determine whether ongoing traffic can be routed over existing PDU (Protocol Data Unit) sessions belonging to other Network Slices or established new PDU session(s) associated with same/other Network Slice (Non-Patent Literature 1, 5.15.5.2.2).

CITATION LIST

Non Patent Literature

[NPL 1]
Technical Specification (TS) 23.501, V1.4.0.
[NPL 2]
TS 23.502, V1.2.0.

Based on the current agreements in Non-Patent Literature 1 and Non-Patent Literature 2 by 3GPP SA2 Working Group:
the 3GPP 5G specs do not describe how the NSSP rules are configured at the UE or relayed to the UE; and
there is no description on how and when the NSSP rules in the UE can be updated.

SUMMARY

Accordingly, the present disclosure seeks to provide systems, devices and methods for at least partially addressing one or more of these issues.

A policy control function, PCF, node as an aspect of the present disclosure is a PCF node, including
transmitting means for transmitting a message related to information for updating policies of at least one of User Equipment, UE, access and Protocol Data Unit, PDU, Session selection, to a UE via an Access and Mobility Management Function, AMF, node.

Further, an Access and Mobility Management Function, AMF, node as another aspect of the present disclosure is an AMF node, including:
receiving means for receiving information for updating policies of at least one of User Equipment, UE, access and Protocol Data Unit, PDU, Session selection, from a policy control function, PCF, node; and
transmitting means for transmitting a message related to the information, to a UE.

Further, a User Equipment, UE, as another aspect of the present disclosure is a UE, including
receiving means for receiving a message related to information for updating policies of at least one of UE access and Protocol Data Unit, PDU, Session selection, from a policy control function, PCF, node via an Access and Mobility Management Function, AMF, node.

Further, a mobile communication system as another aspect of the present disclosure is a mobile communication system, including:
an Access and Mobility Management Function, AMF, node;
a Policy Control Function, PCF, node; and
a User Equipment, UE, wherein
the PCF node is configured to transmit a message related to information for updating policies of at least one of UE access and Protocol Data Unit, PDU, Session selection, to the UE via the AMF node,
the UE is configured to receive a message related to information for updating policies of at least one of UE access and PDU Session selection, from the PCF node via the AMF node, and
the AMF node is configured to:
receive the information for updating policies of at least one of the UE access and PDU Session selection, from the PCF node; and
transmit a message related to the information, to the UE.

Further, a control method in a policy control function, PCF, node as another aspect of the present disclosure is a control method in a PCF node, including
transmitting a message related to information for updating policies of at least one of User Equipment, UE, access and Protocol Data Unit, PDU, Session selection, to a UE via an Access and Mobility Management Function, AMF, node.

Further, a control method in an Access and Mobility Management Function, AMF, node as another aspect of the present disclosure is a control method in an AMF node, including:
receiving information for updating policies of at least one of User Equipment, UE, access and Protocol Data Unit, PDU, Session selection, from a policy control function, PCF, node; and
transmitting a message related to the information, to a UE.

Further, a control method in a User Equipment, UE as another aspect of the present disclosure is a control method in a UE, including
receiving a message related to information for updating policies of at least one of UE access and Protocol Data Unit, PDU, Session selection, from a policy control function, PCF, node via an Access and Mobility Management Function, AMF, node.

With the configurations as described above, the present disclosure can provide a PCF node, an AMF node, a UE and a mobile communication system that solve a problem how the NSSP rules are configured at the UE or relayed to the UE.

DESCRIPTION OF ASPECTS

<First Example Aspect>

UE 3 Configuration and Update with the NSSP Rules

The NSSP includes one or more NSSP rules, each one associating an application with a certain Network Slice (e.g. S-NSSAI). This creates a direct dependence between the NSSP rules and the Allowed S-NSSAIs in the UE 3, i.e. an update to the allowed S-NSSAI list in the UE 3 may require an update to the NSSP rules in the UE 3 too.

That is why it is proposed to configure and/or update the NSSP rules in the UE every time the allowed S-NSSAI list in the UE 3 is configured or updated. The allowed S-NSSAI(s) may change due to deployment variations or UE subscription changes.

Otherwise, the UE 3 may not be able to apply the NSSP rules if the NSSP rules have not been updated to follow possible changes in the allowed S-NSSAIs in the UE 3.

The solution proposes the network to configure or update the UE 3 with the latest NSSP rules while the UE 3 is in connected mode.

Note: allowed S-NSSAI(s) or allowed S-NSSAI list are identical to 'Allowed NSSAI' as the NSSAI is a collection of S-NSSAI(s) as per the definition of NSSAI in Non-Patent Literature 1.

Figure 1:
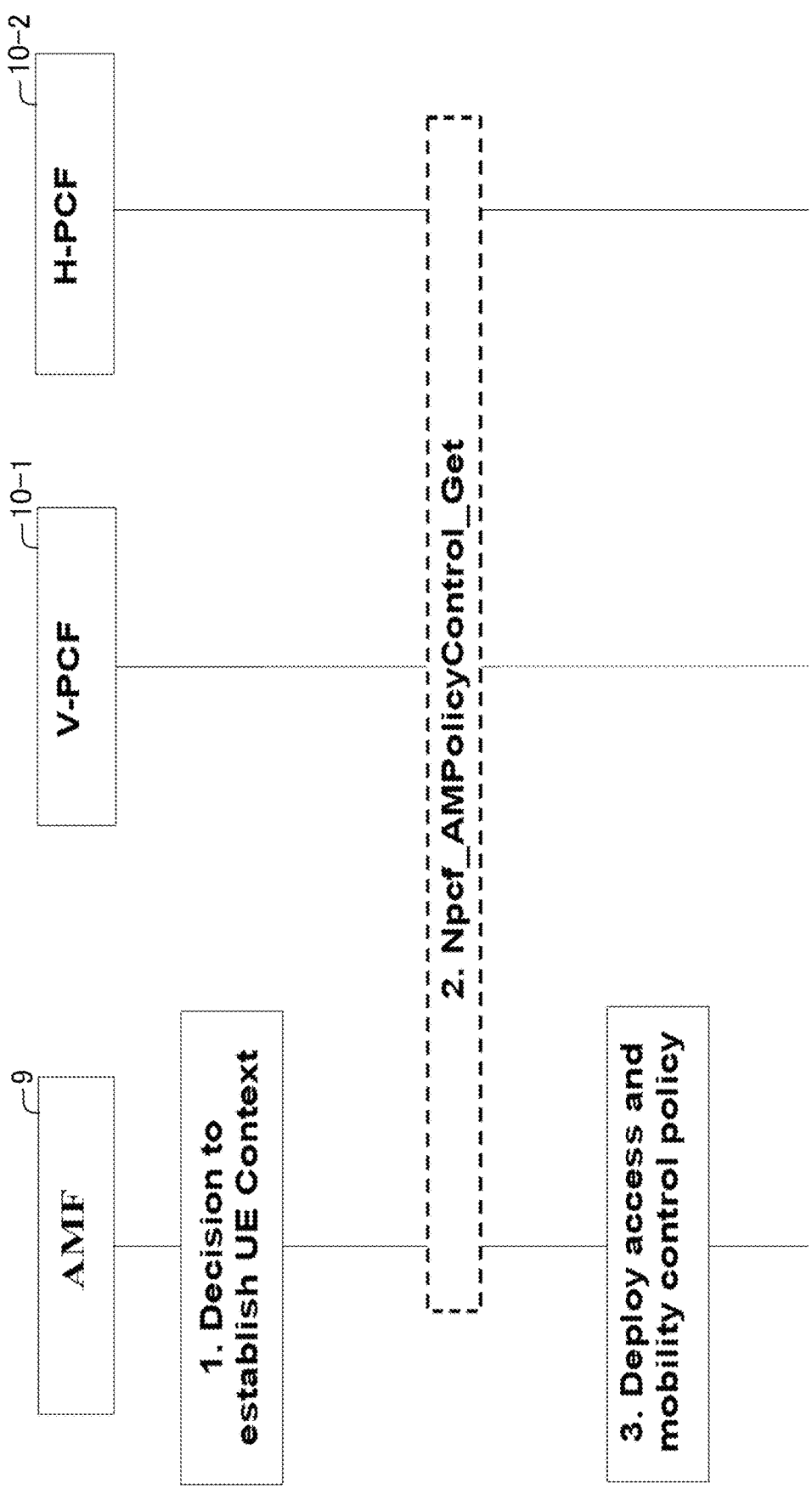
FIG. 1 illustrates further details of the UE Context Establishment during registration.
Figure 2:
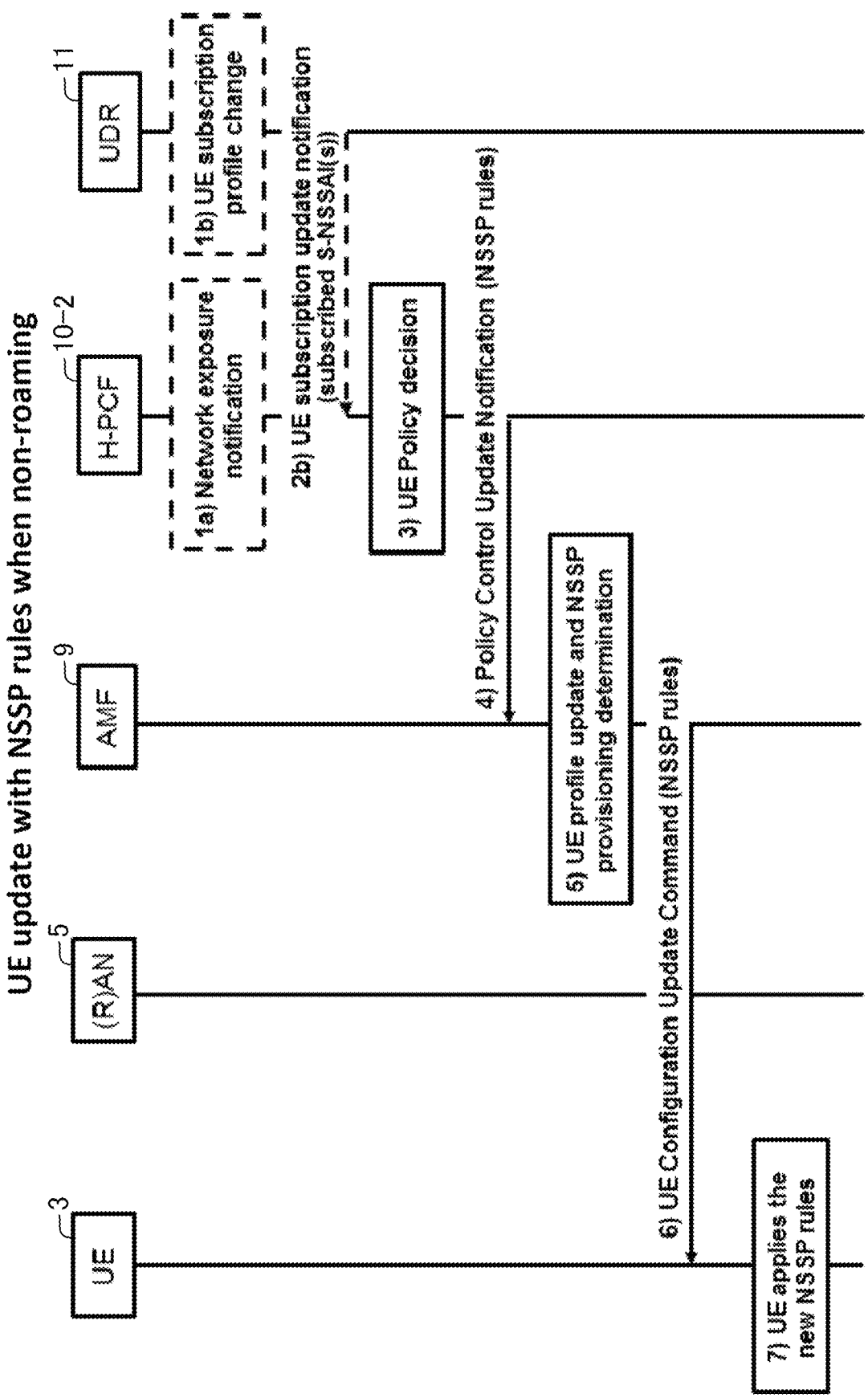
FIG. 2 describes the sequence of the events for a non-roaming case.

FIG. 2 describes the sequence of the events for a non-roaming case.

In more detail, FIG. 2 is an example signalling (timing) diagram schematically illustrating the following steps:

1a) The H-PCF 10-2 may receive a notification from an Application Function (AF), directly or via NEF (Network Exposure Function), about S-NSSAI(s) availability in general or any S-NSSAI restriction per UE 3 or per group of UEs while roaming. The AF could also indicate a change of the UE Policy for a specific UE 3 or group of UEs, for example change of the NSSP rules. The AF requests/notifications are sent to the H-PCF 10-2 via a N5 (in case of requests regarding on-going PDU sessions of individual UEs, for an AF allowed to interact directly with the 5GC NFs) or via the Network Exposure Function (NEF). An example for such a request or notification is Namf_EventExposure_Notify (NSSP rules, allowed/disallowed S-NSSAI(s)) service operation that triggers the change in one or more elements of the UE Policy, e.g. change to NSSP rules or an allowed S-NSSAI list. Requests or notifications that target multiple UE(s) 3 are sent via the NEF and may target multiple H-PCF (s) 10-2.

1b) The UDR 11 may detect that the subscription policy profile of the UE 3 has changed. One example of the subscription profile change that impacts the UE Policy (e.g. NSSP rules of the UE 3) is a change of the S-NSSAI(s) that the UE 3 is subscribed to.

2b) The UDR 11 notifies the H-PCF 10-2 of the updated subscriber profile via, for example, Nudr_PolicyManagement_UpdateNotify (UE_Policy, subscribed S-NSSAI(s)) or Nudr_User_Management_Notify (UE_Policy, subscribed S-NSSAI(s)) service operation including for example the updated UE_Policy like NSSP rules and/or the updated subscribed S-NSAI(s).

3) The H-PCF 10-2 makes a policy decision that triggers the change in the UE Policy, e.g. change in NSSP rules for a specific UE 3 or group of UEs based on the subscription changes in the UDR 11 and/or the information received from the AF.

4) The H-PCF 10-2 notifies the AMF 9 about the update of the UE Policy rules, e.g. the update of the NSSP rules via, for example, Npcf_AMPolicy Control_UpdateNotify (NSSP rules) message that includes the updated NSSP rules. The AMF 9 sends an Acknowledgement to the H-PCF 10-2.

5) The AMF 9 deploys the updated UE Policy (e.g. the updated NSSP rules). The procedure includes storing the updated NSSP rules and determining whether the AMF 9 provisions the NSSP rules to the UE 3. For this, the AMF 9 determines the necessity for the UE configuration update due to updated NSSP rules for that UE 3 or due to UE subscription change.

The AMF 9 can also determine on whether the UE configuration update with the latest changes to the UE Policy (e.g. NSSP rules) is urgent or not (e.g. whether the UE configuration update is needed immediately or it can wait) by analysing the changes to the UE Policy rules (e.g. analysing the extend of the NSSP rules changes, whether any active PDU sessions are impacted, whether any already selected/active Network Slices are involved and etc). If changes to the UE Policy (e.g. NSSP rules) are significant and/or the updates to the UE Policy (e.g. NSSP rules) impact existing PDU session(s) and/or impact active Network Slices (S-NSSAIs), the AMF 9 may decide to update the UE Policy (e.g. UE NSSP rules) in the UE 3 sooner than later so that the UE 3 can take advantage of the updated UE Policy (e.g. NSSP rules) with no delay. For example, the UE 3 can re-establish a new PDU session based on the latest updates to the NSSP rules. If the AMF 9 determines to update the UE configuration with the updated UE Policy (e.g. NSSP rules) sooner and if the UE 3 is in idle mode, then the AMF 9 should initiate the Network triggered Service Request procedure as stated in step 6. The AMF 9 decisions can be controlled by or based on the operator's settings, configurations or policies.

6) If the UE 3, for which the UE Policy (e.g. NSSP rules) have changed, is in connected mode:

the AMF 9 may trigger the UE Configuration Update procedure in order to provision the UE 3 with the updated UE Policy (e.g. NSSP rules). The AMF 9 sends a UE Configuration Update Command (NSSP rules) to the UE 3 in which the AMF 9 includes the latest UE Policy (e.g. NSSP rules). The AMF 9 may also include in the UE Configuration Update Command message a UE Configuration Update cause indicating whether the UE 3 shall acknowledge the UE Configuration Command or not.

If the UE 3, for which the UE Policy (e.g. NSSP rules) have changed, is in idle mode, the AMF 9 may either:

wait for the UE 3 to connect and then trigger the UE Configuration Update Command (NSSP rules) message in order to provision the UE 3 with the updated NSSP rules. This process can be performed based on the Asynchronous Type Communication; or trigger Network triggered Service Request in order to bring the UE 3 in connected mode and then trigger the UE Configuration Update Command (NSSP rules) message in order to provision the UE 3 with the updated NSSP rules; or wait for the Registration Request message to come from the UE 3 and then provision the UE 3 with the updated NSSP rules within the Registration Accept message. This process can be performed based on the Asynchronous Type Communication.

If the UE Configuration Update cause requires acknowledgment of the UE Configuration Update Command message, then the UE 3 shall send a UE Configuration Update Complete message to the AMF 9.

7) The UE 3 updates the stored NSSP rules with the updated NSSP rules that it has received from the AMF 9, and the UE 3 uses the new NSSP rules to determine:

whether ongoing traffic can be routed over existing PDU sessions belonging to other Network Slices (e.g. S-NSSAI(s)) or established new PDU session(s) associated with same/other Network Slice; or whether existing PDU session(s) that is associated with a Network Slice (e.g. S-NSSAI(s)) can be maintained or not. If the existing PDU session(s) cannot be maintained according to the new updated NSSP rules, then the UE 3 initiates a PDU session release procedure to release the PDU session(s). In this case, the UE 3 may start network search looking for another PLMN that can provide a connection to the Network Slice as per the new NSSP rules.

Figure 3:
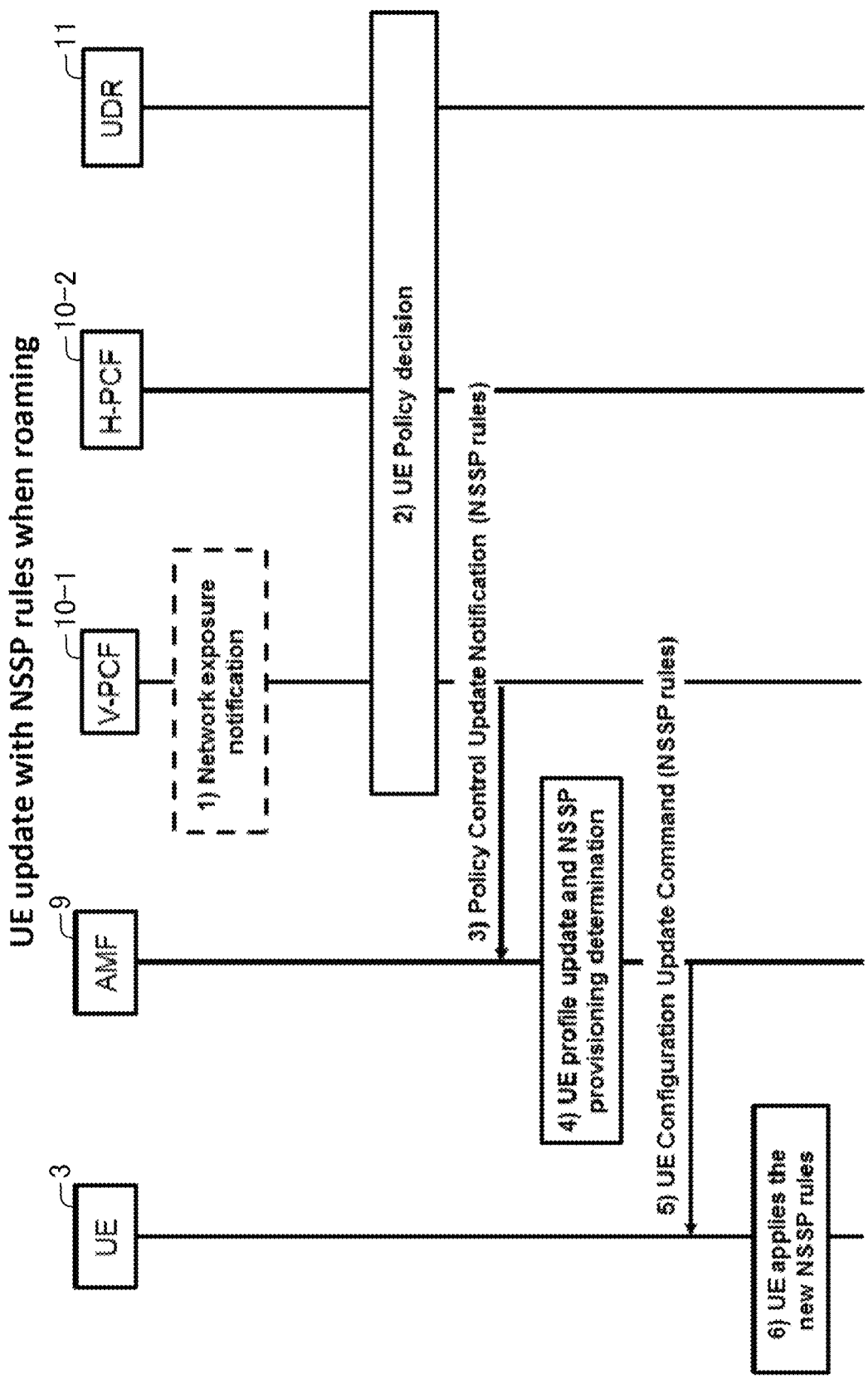
FIG. 3 describes the sequence of the events for a roaming case.

FIG. 3 describes the sequence of the events for a roaming case.

In more detail, FIG. 3 is an example signalling (timing) diagram schematically illustrating the following steps:

1) The V-PCF 10-1 may receive a notification from an Application Function (AF), directly or via NEF (Network Exposure Function), about S-NSSAI availability in general or any Network Slice (e.g. S-NSSAI) restriction per UE 3 or per group of UEs while roaming. The AF could also indicate a change of the UE Policy for a specific UE 3 or group of UEs, for example change of the NSSP rules while roaming. The AF requests/notifications are sent to the V-PCF 10-1 via a N5 (in case of requests regarding on-going PDU sessions of individual UEs, for an AF allowed to interact directly with the 5GC NFs) or via the NEF. An example for such a request or notification is Namf_EventExposure_Notify (NSSP rules, allowed/disallowed S-NSSAI(s)) service operation that triggers the change in one or more elements of the UE Policy, e.g. change to NSSP rules or Allowed S-NSSAI list. Requests or notifications that target multiple UE(s) 3 are sent via the NEF and may target multiple H-PCF(s) 10-2.

2) The V-PCF 10-1 makes a policy decision that triggers the change in the UE Policy, e.g. change in NSSP rules for a specific UE 3 or group of UEs while roaming. The V-PCF 10-1 may contact the H-PCF 10-2 to retrieve the UE Policy (e.g. NSSP rules) or allowed S-NSSAI(s) or any other policy or subscription information for that UE 3 or group of UEs. The H-PCF 10-2 may in its turn retrieve subscription information from the UDR 11. Then the V-PCF 10-1 may modify the UE Policy (e.g. NSSP rule) and/or any other subscription and/or policy information retrieved from the H-PCF 10-2 based on the information received from the AF at step 1 and apply them for that UE 3 or group of UEs while roaming.

3) The V-PCF 10-1 notifies the AMF 9 about the update of the UE Policy rules, e.g., the update of the NSSP rules via, for example, Npcf_AMPolicy Control_UpdateNotify (NSSP rules) message that includes the updated NSSP rules. The AMF 9 sends Acknowledgement to the V-PCF 10-1.

Note: Next steps 4, 5, 6 are generally identical to steps 5, 6, 7 from FIG. 2.

4) The AMF 9 deploys the updated UE Policy (e.g. the updated NSSP rules). The procedure includes storing the updated NSSP rules and determining whether the AMF 9 provisions the NSSP rules to the UE 3. For this, the AMF 9 determines the necessity for the UE configuration update due to updated NSSP rules for that UE 3 or due to UE subscription change.

The AMF 9 can also determine on whether the UE configuration update with the latest changes to the UE Policy (e.g. NSSP rules) is urgent or not (e.g. whether the UE configuration update is needed immediately or it can wait) by analysing the changes to the UE Policy rules (e.g. analysing the extend of the NSSP rules changes, whether any active PDU sessions are impacted, whether any already selected/active Network Slices are involved and etc). If changes to the UE Policy (e.g. NSSP rules) are significant and/or the updates to the UE Policy (e.g. NSSP rules) impact existing PDU session(s) and/or impact active Network Slices (S-NSSAIs), the AMF 9 may decide to update the UE Policy (e.g. UE NSSP rules) in the UE 3 sooner than later so that the UE 3 can take advantage of the updated UE Policy (e.g. NSSP rules) with no delay. For example, the UE 3 can re-establish a new PDU session based on the latest updates to the NSSP rules. If the AMF 9 determines to update the UE configuration with the updated UE Policy (e.g. NSSP rules) sooner and if the UE 3 is in idle mode, then the AMF 9 should initiate the Network triggered Service Request procedure as stated in step 6. The AMF 9 decisions can be controlled by or based on the operator's settings, configurations or policies.

5) If the UE 3, for which the UE Policy (e.g. NSSP rules) have changed, is in connected mode:

the AMF 9 may trigger the UE Configuration Update procedure in order to provision the UE 3 with the updated UE Policy (e.g. NSSP rules). The AMF 9 sends a UE Configuration Update Command (NSSP rules) to the UE 3 in which the AMF 9 includes the latest UE Policy (e.g. NSSP rules). The AMF 9 may also include in the UE Configuration Update Command message a UE Configuration Update cause indicating whether the UE 3 shall acknowledge the UE Configuration Command or not.

If the UE 3, for which the UE Policy (e.g. NSSP rules) have changed, is in idle mode, the AMF 9 may either:

wait for the UE 3 to connect and then trigger the UE Configuration Update Command (NSSP rules) message in order to provision the UE 3 with the updated NSSP rules. This process can be performed based on the Asynchronous Type Communication; or trigger Network triggered Service Request in order to bring the UE 3 in connected mode and then trigger the UE Configuration Update Command (NSSP rules) message in order to provision the UE 3 with the updated NSSP rules; or wait for the Registration Request message to come from the UE 3 and then provision the UE 3 with the updated NSSP rules within the Registration Accept message. This process can be performed based on the Asynchronous Type Communication.

If the UE Configuration Update cause requires acknowledgment of the UE Configuration Update Command message, then the UE 3 shall send a UE Configuration Update Complete message to the AMF 9.

6) The UE 3 updates the stored NSSP rules with the updated NSSP rules that it has received from the AMF 9, and the UE 3 uses the new NSSP rules to determine:

whether ongoing traffic can be routed over existing PDU sessions belonging to other Network Slices (e.g. S-NSSAI(s)) or established new PDU session(s) associated with same/other Network Slice; or whether existing PDU session(s) that is associated with a Network Slice (e.g. S-NSSAI(s)) can be maintained or not. If the existing PDU session(s) cannot be maintained according to the new updated NSSP rules, then the UE 3 initiates a PDU session release procedure to release the PDU session(s). In this case, the UE 3 may start network search looking for another PLMN that can provide a connection to the Network Slice as per the new NSSP rules.

Figure 4:
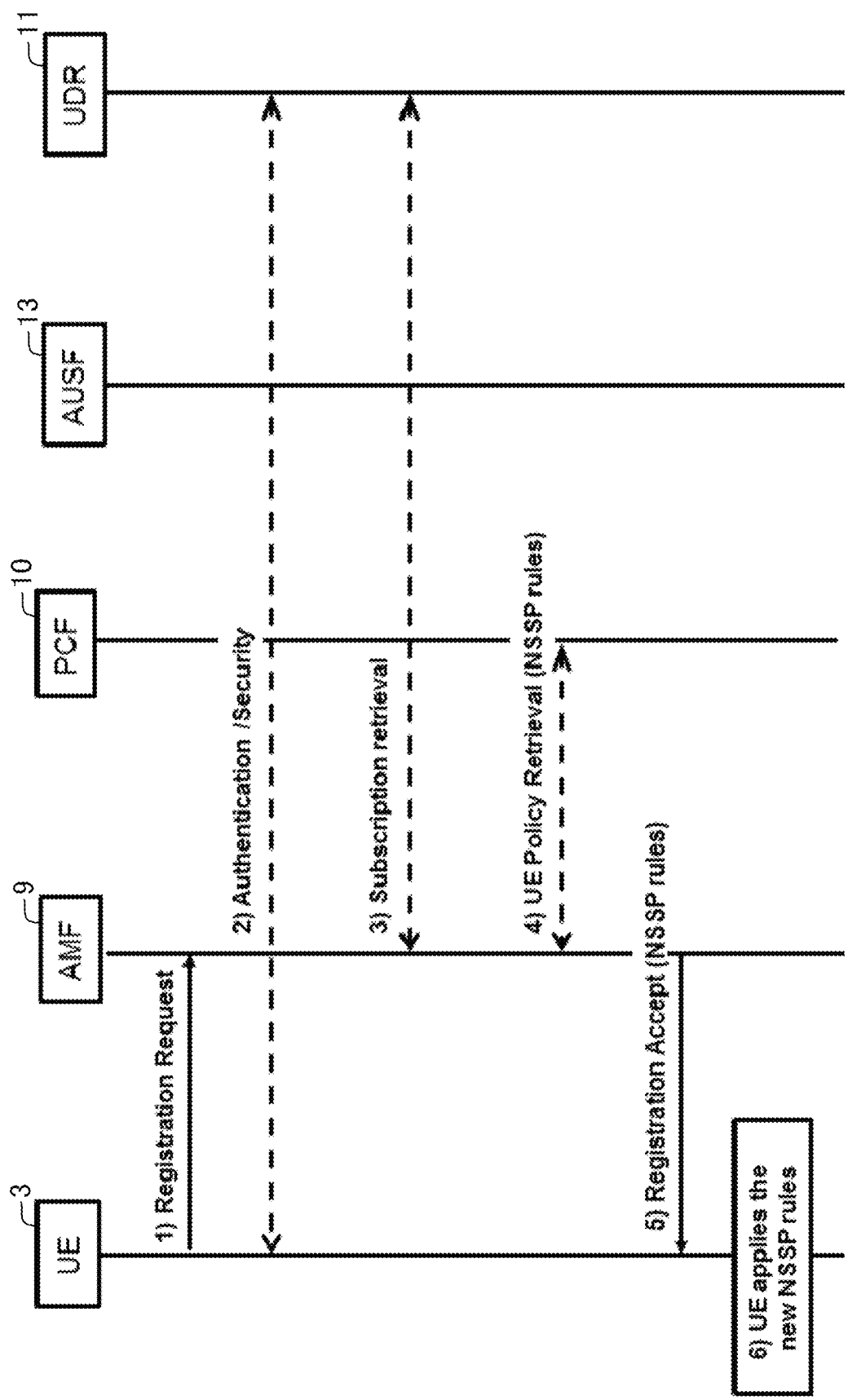
FIG. 4 is an example signaling (timing) diagram schematically illustrating a procedure for updating a UE with NSSP rules at registration.

In another aspect the NSSP rules can be updated and delivered to the UE 3 or just delivered to the UE 3 if previously updated during the UE registration procedure, as generally illustrated in FIG. 4.

FIG. 4 is an example signalling (timing) diagram schematically illustrating a procedure for updating a UE 3 with NSSP rules at registration, including the following steps:

1) Registration Request—When a UE 3 needs to register or re-register with the network, the UE 3 establishes a connection with a (R)AN 5 and triggers Registration Request message towards an AMF 9 selected by the (R)AN node.

2) The AMF 9 may decide to initiate UE Authentication by invoking the Authentication and Security Function (AUSF) 13. As a result, an Authentication and NAS Security is performed.

3) The AMF 9 may retrieve the subscription data from the UDR 11 and the AMF 9 may also subscribe to be notified when the subscription data is modified.

4) If the AMF 9 has not yet obtained the Access and Mobility Policy and UE Policy (e.g. NSSP rules) for the UE 3 or if the Access and Mobility Policy and UE Policy (e.g. NSSP rules) in the AMF 9 are no longer valid or the Allowed NSSAI for the UE 3 was updated during the registration procedure however, the AMF 9 does not have an associated UE Policy (e.g. NSSP rules) for the updated Allowed NSSAI, the AMF 9 requests the PCF 10 to apply the operator policies for the UE 3 from the PCF 10 (for example via Npcf_AMPolicyControl_Get service operation). In roaming case, the interaction between H-PCF 10-2 and V-PCF 10-1 is required for the provision of Access and Mobility policy and UE Policy (e.g. NSSP rules). In roaming, the V-PCF 10-1 may modify the UE Policy (e.g. NSSP rules) based on local Network Slice (e.g. S-NSSAI(s)) availability and/or restrictions. The PCF 10 gets the policy subscription related information, if not available, from the UDR 11, for example via Nudr_User_Data_management query service operation and makes a policy decision. Based on the retrieved subscription information from the UDR 11 e.g. UE 3 subscribed S-NSSAI(s) and/or any other information that may impact the UE Policy, the PCF 10 may update the UE Policy (e.g. NSSP rules) for the UE 3. Then the PCF 10 responds to the AMF 9 (for example, via Npcf_AMPolicyControl_Get service operation) and provides the latest NSSP rules.

5) The AMF 9 sends a Registration Accept message to the UE 3 indicating that the registration has been accepted. In the Registration Accept message the AMF 9 includes the latest NSSP rules.

6) The UE 3 updates the stored NSSP rules with the updated NSSP rules that it has received from the AMF 9, and the UE 3 uses the new NSSP rules to determine:

whether ongoing traffic can be routed over existing PDU sessions belonging to other Network Slices (e.g. S-NSSAI(s)) or established new PDU session(s) associated with same/other Network Slice; or whether existing PDU session(s) that is associated with a Network Slice (e.g. S-NSSAI(s)) can be maintained or not. If the existing PDU session(s) cannot be maintained according to the new updated NSSP rules, then the UE 3 initiates a PDU session release procedure to release the PDU session(s). In this case, the UE 3 may start network search looking for another PLMN that can provide a connection to the Network Slice as per the new NSSP rules.

Beneficially, the above described example aspects include, although they are not limited to, one or more of the following functionalities:

The UE NSSP rules update by the H-PCF 10-2 as a result of the UE's Network Slice (e.g. S-NSSAI(s)) subscription change or any other subscription change that impacts the UE Policy (e.g. NSSP rules). The subscription change information is notified to the H-PCF 10-2 by the UDR 11.

The UE NSSP rules update by the H-PCF 10-2 while non-roaming or by the V-PCF 10-1 while roaming as a result of the UE Policy (e.g. NSSP rules) information or Network Slice (e.g. S-NSSAI) availability/restriction information change. This information may be notified to the H-PCF 10-2 or V-PCF 10-1 by the Application Function (AF) directly or via the Network Exposure Function (NEF).

The UE profile update in the AMF 9 due to NSSP rules update. AMF 9 logic to determine how to deliver the UE Policy update (e.g. updated NSSP rules) to the UE 3 or group of UEs while the UE(s) 3 in connected or idle mode, with consideration to the possible impact of the updated NSSP rules to the UE 3 behaviour and/or performance. The use of UE Configuration Update procedure for the updated NSSP rules delivery while the UE 3 is in connected mode.

The UE 3 behaviour on receiving the updated NSSP rules. The UE 3 updates the stored NSSP rules with the updated NSSP rules that it has received from the AMF 9, and the UE 3 uses the new NSSP rules to determine:

whether ongoing traffic can be routed over existing PDU sessions belonging to other Network Slices or established new PDU session(s) associated with same/other Network Slice; or whether existing PDU session(s) that is associated with a Network Slice can be maintained or not. If the existing PDU session(s) cannot be maintained according to the new updated NSSP rules, then the UE 3 initiates a PDU session release procedure to release the session(s). In this case, the UE 3 may start network search looking for another PLMN that can provide a connection to the Network Slice as per the new NSSP rules.

In summary, it can be seen that the present document describes a method comprising one or more of the following steps:

1) Network Slice (e.g. S-NSSAI(s)) subscription change or any other subscription change for a UE 3 that impacts the UE Policy (e.g. NSSP rules) shall be notified to the H-PCF 10-2 by the UDR 11.

2) UE Policy (e.g. NSSP rules) information or Network Slice (e.g. S-NSSAI) availability/restriction information shall be notified to the H-PCF 10-2 while the UE 3 is not-roaming or to the V-PCF 10-1 while the UE 3 is roaming by the Application Function (AF) directly or via the Network Exposure Function (NEF).

3) The AMF 9 shall update the UE profile due to NSSP rules update. The AMF 9 shall analyse and determine on how to deliver the UE Policy update (e.g. updated NSSP rules) to the UE 3 or group of UEs while the UE(s) 3 in connected or idle mode, based on the urgency and on/or how the updated NSSP rules impact the UE 3 behaviour and performance. The UE Configuration Update procedure message shall be used to deliver the updated NSSP rules to the UE 3 in connected mode.

4) The UE 3 updates the stored NSSP rules with the updated NSSP rules that it has received from the AMF 9, and the UE 3 uses the new NSSP rules to determine:

whether ongoing traffic can be routed over existing PDU sessions belonging to other Network Slices or established new PDU session(s) associated with same/other Network Slice; or whether existing PDU session(s) that is associated with a Network Slice can be maintained or not. If the existing PDU session(s) cannot be maintained according to the new updated NSSP rules, then the UE 3 initiates a PDU session release procedure to release the session(s). In this case, the UE 3 may start network search looking for another PLMN that can provide a connection to the Network Slice as per the new NSSP rules.

Benefits

It can be seen that the above aspects provides a number of benefits, including (but not limited to) one or more of the following:

Currently, the NSSP rules are configured in the UE 3 during the registration procedure by the Home network only. However there is a problem as if the NSSP rules are update by the network, the UE 3 would get the updated NSSP rules at the next registration or re-registration. The delay of updating the UE 3 with the latest NSSP rules could take long time waiting for the next registration procedure. The end result is the UE 3 could be using an out of date NSSP rules that are likely to lead to inefficient PDU connections routing over the network slices or PDU connection failures.

The proposed solution allows for dynamic and update provision of the UE 3 with any changes of the NSSP rules between the UE 3 registrations by providing the updated NSSP rules to the UE 3 via the UE Configuration Update procedure if the UE 3 is in connected mode or via bringing the UE 3 in connected mode with the Network triggered Service Request procedure and then providing the UE 3 with the latest NSSP rules with the UE Configuration Update procedure in connected mode. This allows for the UE 3 to use the latest NSSP rules for more efficient PDU session routing and avoiding PDU sessions failures due to out of date NSSP rules.

System Overview

Figure 5:
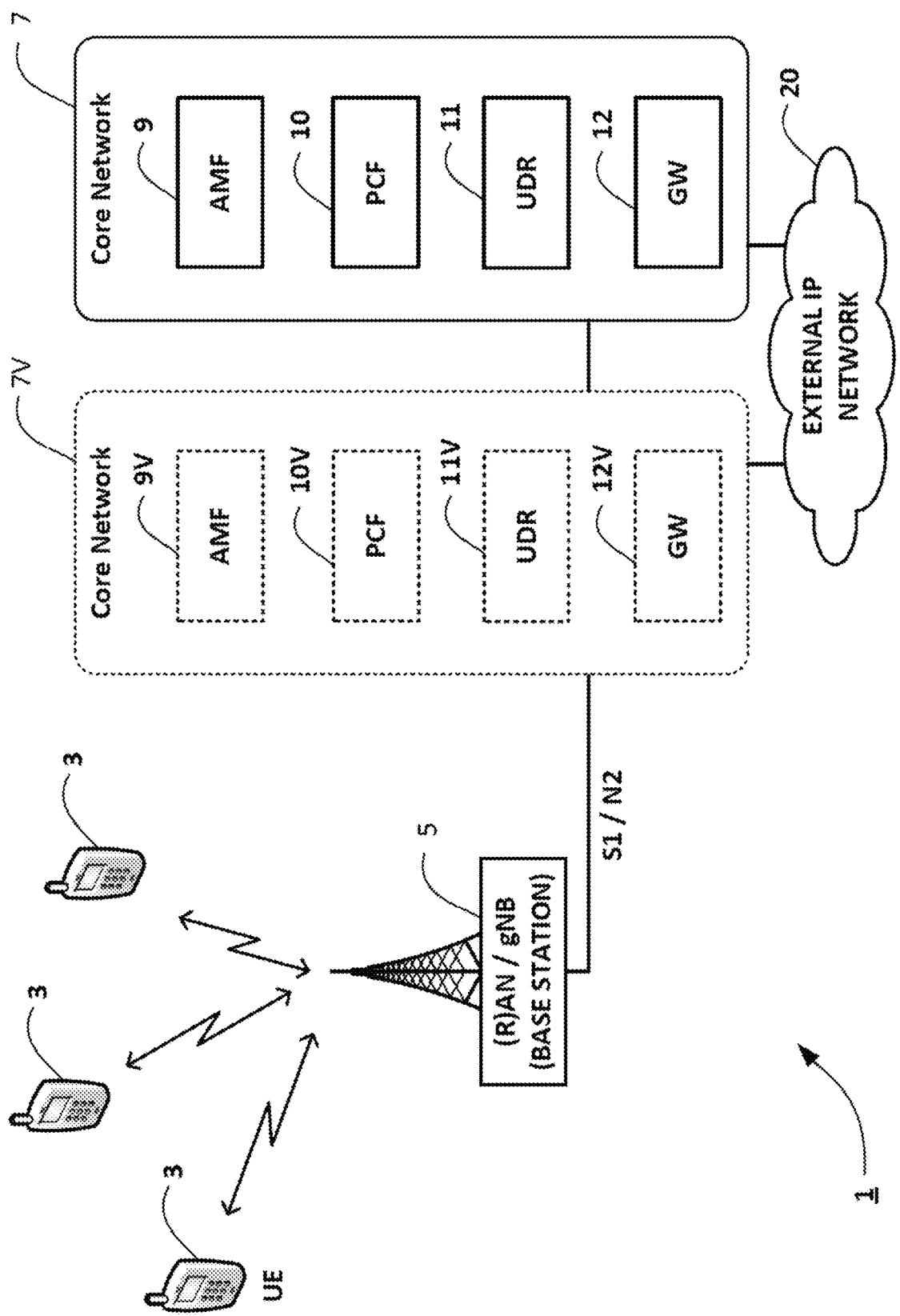
FIG. 5 schematically illustrates a mobile (cellular or wireless) telecommunication system 1.

FIG. 5 schematically illustrates a mobile (cellular or wireless) telecommunication system 1 to which the above aspects are applicable.

In this network, users of mobile devices 3 (or user equipment, 'UE 3') can communicate with each other and other users via respective base stations 5 and a core network 7 using a 5G radio access technology (RAT). It will be appreciated that a number of base stations 5 (or 'gNBs' in 5G networks) form a (radio) access network. As those skilled in the art will appreciate, whilst three mobile devices 3 and one base station 5 are shown in FIG. 5 for illustration purposes, the system, when implemented, will typically include other base stations and mobile devices. It will also be appreciated that the (radio) access network may also support an E-UTRA radio access technology (e.g. instead of or in addition to 5G).

The core network 7 typically includes logical nodes (or 'functions') for supporting communication in the telecommunication system 1. Typically, for example, the core network 7 of a 'Next Generation'/5G system will include, amongst other functions, control plane functions and user plane functions.

As is well known, a mobile device 3 may enter and leave the areas (i.e. radio cells) served by the base stations 5 or the (R)AN 5 as the mobile device 3 is moving around in the geographical area covered by the telecommunication system 1. In order to keep track of the mobile device 3 and to facilitate movement between the different base stations 5, the core network 7 comprises at least one access and mobility management function (AMF) 9. The AMF 9 is in communication with the base station 5 coupled to the core network 7. In some core networks, a mobility management entity (MME) may be used instead of the AMF 9.

The core network 7 also includes, amongst others, a Policy Control Function (PCF) 10, Unified Data Repository (UDR) 11, and one or more gateways 12. When the mobile device 3 is roaming to a visited network (Visited PLMN), the home network (HPLMN) of the mobile device 3 also includes an associated core network portion (denoted core network 7V in FIG. 5) which provides at least some of the functionalities of the AMF 9, PCF 10, and UDR 11 for the roaming mobile device 3.

The mobile devices 3 and their respective serving base stations 5 are connected via an appropriate air interface (for example the so-called "Uu" interface and/or the like). Neighbouring base stations 5 are connected to each other via an appropriate base station to base station interface (such as the so-called "Xn" interface and/or the like), either directly or via an appropriate (home) base station gateway. Each base station 5 is also connected to the core network nodes via an appropriate interface (such as the so-called "N2"/"N3" interface(s) and/or the like). From the core network 7, connection to an external IP network 20 (such as the Internet) is also provided.

User Equipment (UE 3)

Figure 6:
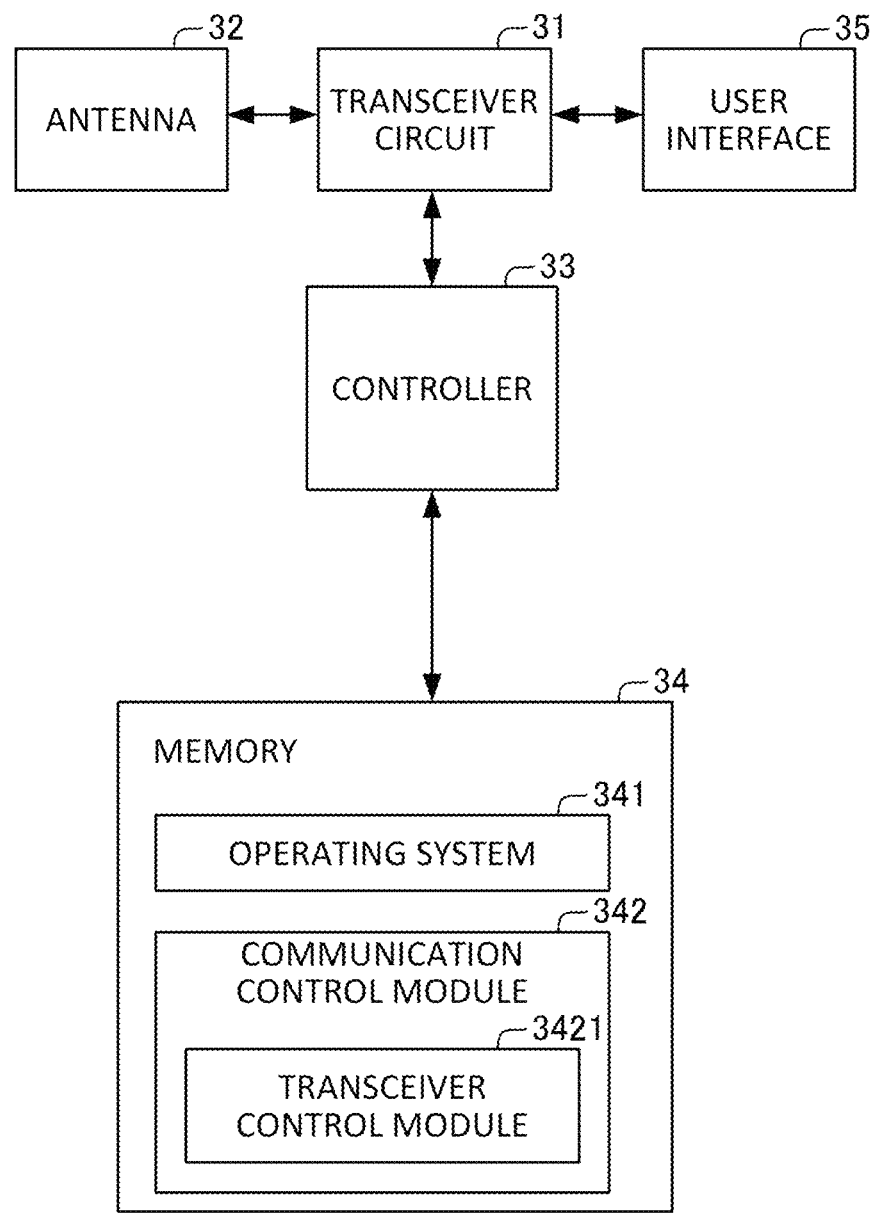
FIG. 6 is a block diagram illustrating the main components of the UE.

FIG. 6 is a block diagram illustrating the main components of the UE 3 (mobile device 3). As shown, the UE 3 includes a transceiver circuit 31 which is operable to transmit signals to and to receive signals from the connected node(s) via one or more antenna 32. Although not necessarily shown in FIG. 6, the UE 3 will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example. A controller 33 controls the operation of the UE 3 in accordance with software stored in a memory 34. The software includes, among other things, an operating system 341 and a communications control module 342 having at least a transceiver control module 3421. The communications control module 342 (using its transceiver control module 3421) is responsible for handling (generating/sending/receiving) signalling and uplink/downlink data packets between the UE 3 and other nodes, such as the base station/(R)AN node and the AMF 9. Such signalling may include, for example, appropriately formatted signalling messages (e.g. a registration request and associated responses) relating to access and mobility management procedures (for the UE 3), and in particular, signalling messages relating to NSSP configuration and update for the UE 3.

Network Apparatus (e.g. AMF 9/PCF 10/UDR 11)

Figure 7:
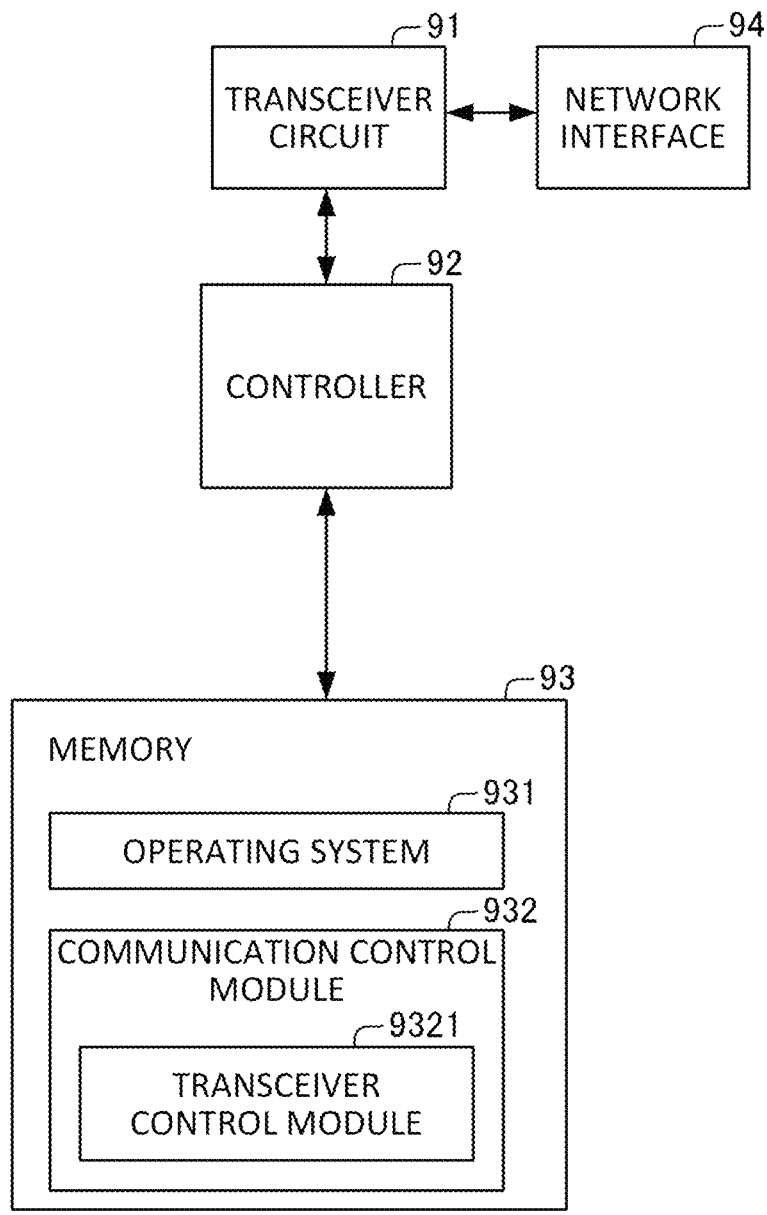
FIG. 7 is a block diagram illustrating the main components of the AMF.
Figure 8:
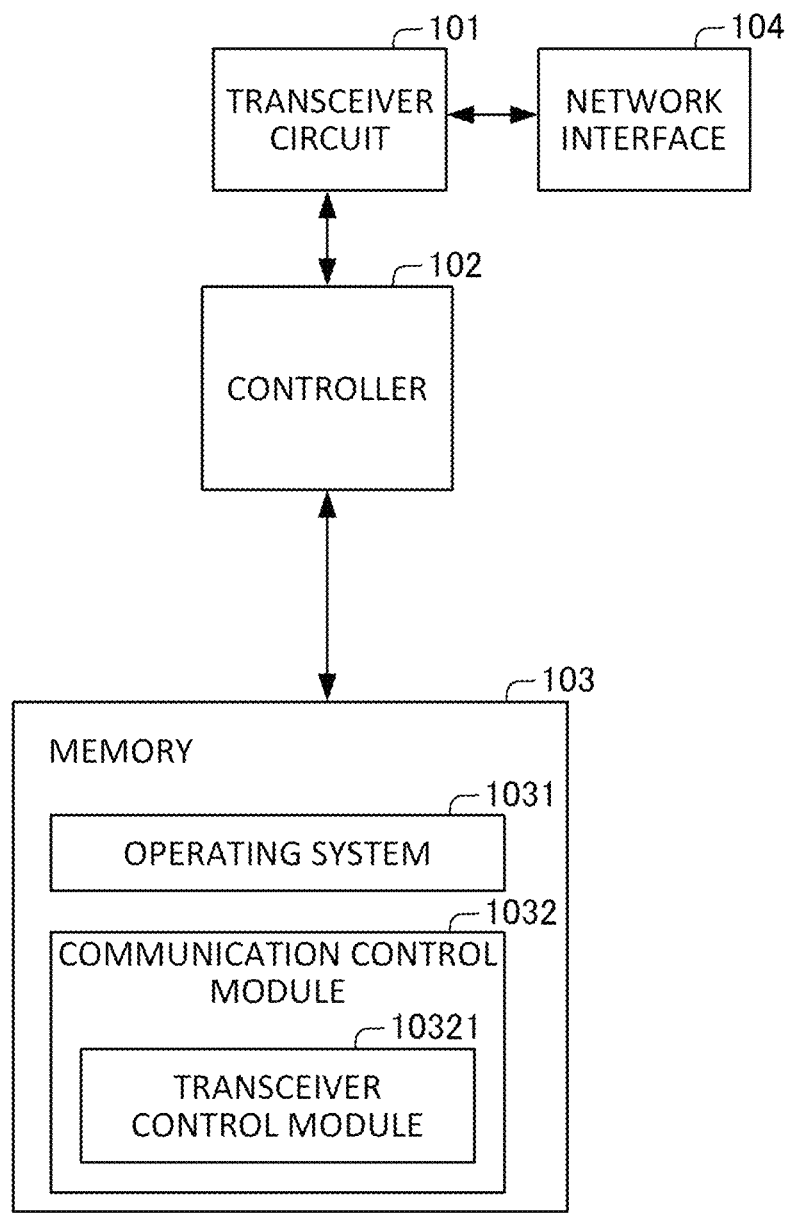
FIG. 8 is a block diagram illustrating the main components of the PCF.
Figure 9:
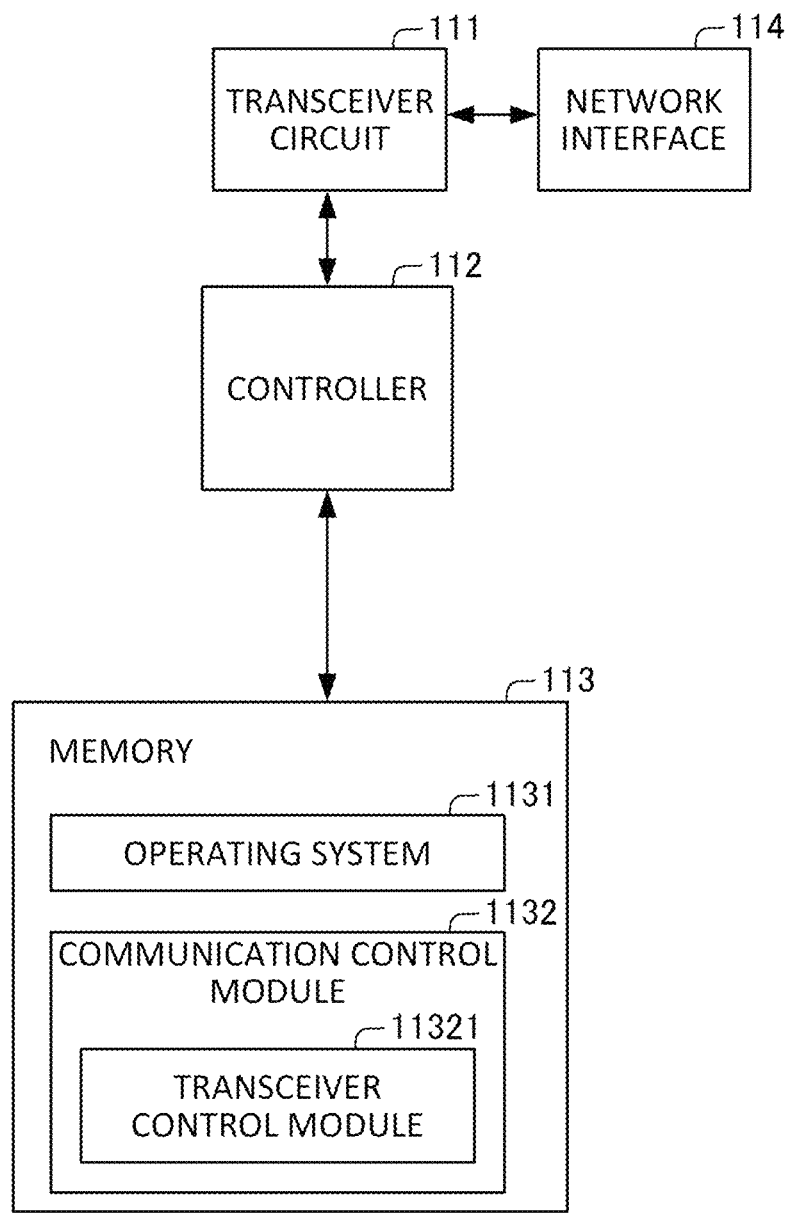
FIG. 9 is a block diagram illustrating the main components of the UDR.

FIG. 7 is a block diagram illustrating the main components of a network apparatus. To be specific, FIG. 7 shows a block diagram of the AMF 9, FIG. 8 shows a block diagram of the PCF 10, and FIG. 9 shows a block diagram of the UDR 11. As shown, the apparatus includes a transceiver circuit (91,101,111) which is operable to transmit signals to and to receive signals from other nodes (including the UE 3) via a network interface. A controller (92,102,112) controls the operation of the apparatus in accordance with software stored in a memory (93,103,113). Software may be pre-installed in the memory (93,103,113) and/or may be downloaded via the telecommunication network or from a removable data storage device (RAID), for example. The software includes, among other things, an operating system (931,1031,1131) and a communications control module (932,1032,1132) having at least a transceiver control module (9321,10321,11321). The communications control module (932,1032,1132) (using its transceiver control module (9321,10321,11321)) is responsible for handling (generating/sending/receiving) signalling between the apparatus and other nodes, such as the UE 3 (e.g. via the base station/(R) AN node) and other core network nodes (including core network nodes in the visited/home network when the UE 3 is roaming). Such signalling may include, for example, appropriately formatted signalling messages (e.g. a registration request and associated responses) relating to access and mobility management procedures (for the UE 3), and in particular, signalling messages relating to NSSP configuration and update for the UE 3.

Modifications and Alternatives

Detailed aspects have been described above. As those skilled in the art will appreciate, a number of modifications and alternatives can be made to the above aspects whilst still benefiting from the disclosures embodied therein. By way of illustration only a number of these alternatives and modifications will now be described.

In the above description, the UE 3 and the network apparatus are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or uncompiled form and may be supplied to the UE 3 and the network apparatus as a signal over a computer network, or on a recording medium. Further, the functionality performed by part or all of this software may be performed using one or more dedicated hardware circuits. However, the use of software modules is preferred as it facilitates the updating of the UE 3 and the network apparatus in order to update their functionalities.

In the above aspects, a 3GPP radio communications (radio access) technology is used. However, any other radio communications technology (e.g. WLAN, Wi-Fi, WiMAX, Bluetooth, etc.) may also be used in accordance with the above aspects.

Items of user equipment might include, for example, communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description but it will be appreciated that the technology described can be implemented on any communication devices (mobile and/or generally stationary) that can connect to a communications network for sending/receiving data, regardless of whether such communication devices are controlled by human input or software instructions stored in memory.

Various other modifications will be apparent to those skilled in the art and will not be described in further detail here.

Abbreviations and Terminology

The following abbreviations and terminology are used in the current document:
5GS 5G System
5G-AN 5G Access Network
5G-RAN 5G Radio Access Network
AF Application Function
AMF Access and Mobility Management Function
APN Access Point Name
AS Access Stratum
AUSF Authentication and Security Function
CP Control Plane
DNN Data Network Name
HPLMN Home Public Land Mobile Network
NAS Non Access Stratum
NF Network Function
NEF Network Exposure Function
NR New Radio
NRF Network Repository Function
NSSF Network Slice Selection Function
NSSP Network Slice Selection Policy
PCF Policy Control Function
(R)AN Radio Access Network
SSCMSP Session and Service Continuity Mode Selection Policy
UDR Unified Data Repository
UE User Equipment
<Supplementary Notes>

The whole or part of the example aspects disclosed above can be described as in, but not limited to, the following supplementary notes. Below, the overview of the PCF node and so on according to the present disclosure will be described.

(Supplementary Note 1)

A policy control function, PCF, node, comprising
transmitting means for transmitting a message related to information for updating policies of at least one of User Equipment, UE, access and Protocol Data Unit, PDU, Session selection, to a UE via an Access and Mobility Management Function, AMF node.

(Supplementary Note 2)

The PCF node according to Supplementary Note 1, wherein the transmitting means transmits the information at a registration procedure for the UE.

(Supplementary Note 3)

The PCF node according to Supplementary Note 1 or 2, wherein the information includes a Network Slice Selection Policy, NSSP.

(Supplementary Note 4)

An Access and Mobility Management Function, AMF, node, comprising:

receiving means for receiving information for updating policies of at least one of User Equipment, UE, access and Protocol Data Unit, PDU, Session selection, from a policy control function, PCF, node; and transmitting means for transmitting a message related to the information, to a UE.

(Supplementary Note 5)

The AMF node according to Supplementary Note 4, wherein the transmitting means transmits the information in a case that the UE is in connected mode.

(Supplementary Note 6)

The AMF node according to Supplementary Note 4, wherein the transmitting means triggers a Network Triggered Service Request in a case that the UE is in idle mode.

(Supplementary Note 7)

The AMF node according to any one of Supplementary Notes 4 to 6, wherein the transmitting means transmits the message at a registration procedure for the UE.

(Supplementary Note 8)

The AMF node according to any one of Supplementary Notes 4 to 7, wherein the receiving means receives acknowledgement of transmitting the message, from the UE.

(Supplementary Note 9)

A User Equipment, UE, comprising receiving means for receiving a message related to information for updating policies of at least one of UE access and Protocol Data Unit, PDU, Session selection, from a policy control function, PCF, node via an Access and Mobility Management Function, AMF, node.

(Supplementary Note 10)

The UE according to Supplementary Note 9, further comprising:

updating means for updating policies of at least one of UE access and PDU Session selection with the information; and determining means for determining at least one of whether maintaining at least one existing PDU session and establishing at least one new PDU session.

(Supplementary Note 11)

The UE according to Supplementary Note 10, wherein the determining means determines whether ongoing traffic are routed over the at least one existing PDU session belonging to other Network Slice than the UE currently uses.

(Supplementary Note 12)

The UE according to Supplementary Note 10, wherein the determining means determines to establish the at least one new PDU session associated with same Network Slice as the UE currently uses or other Network Slice.

(Supplementary Note 13)

The UE according to Supplementary Note 10, wherein the determining means determines to release the at least one existing PDU session associated with same Network Slice as the UE currently uses or other Network Slice.

(Supplementary Note 14)

A mobile communication system, comprising:

an Access and Mobility Management Function, AMF, node;

a Policy Control Function, PCF, node; and a User Equipment, UE;

wherein the PCF node is configured to transmit a message related to information for updating policies of at least one of UE access and Protocol Data Unit, PDU, Session selection, to the UE via the AMF node, the UE is configured to receive a message related to information for updating policies of at least one of UE access and PDU Session selection, from the PCF node via the AMF node, and the AMF node is configured to:

receive the information for updating policies of at least one of the UE access and PDU Session selection, from the PCF node; and transmit a message related to the information, to the UE.

(Supplementary Note 15)

A control method in a policy control function, PCF, node, comprising transmitting a message related to information for updating policies of at least one of User Equipment, UE, access and Protocol Data Unit, PDU, Session selection, to a UE via an Access and Mobility Management Function, AMF, node.

(Supplementary Note 16)

The control method according to Supplementary Note 15, wherein the information is transmitted at a registration procedure for the UE.

(Supplementary Note 17)

The control method according to Supplementary Note 15 or 16, wherein the information includes a Network Slice Selection Policy, NSSP.

(Supplementary Note 18)

A control method in an Access and Mobility Management Function, AMF, node, comprising:

receiving information for updating policies of at least one of User Equipment, UE, access and Protocol Data Unit, PDU, Session selection, from a policy control function, PCF, node; and transmitting a message related to the information, to a UE.

(Supplementary Note 19)

The control method according to Supplementary Note 18, wherein the information is transmitted in a case that the UE is in connected mode.

(Supplementary Note 20)

The control method according to Supplementary Note 19, further comprising triggering a Network Triggered Service Request in a case that the UE is in idle mode.

(Supplementary Note 21)

The control method according to any one of Supplementary Notes 18 to 20, wherein the message is transmitted at a registration procedure for the UE.

(Supplementary Note 22)

The control method according to any one of Supplementary Notes 18 to 21, further comprising receiving acknowledgement of transmitting the message, from the UE.

(Supplementary Note 23)

A control method in a User Equipment, UE, comprising receiving a message related to information for updating policies of at least one of UE access and Protocol Data Unit, PDU, Session selection, from a policy control function, PCF, node via an Access and Mobility Management Function, AMF, node.

(Supplementary Note 24)

The control method according to Supplementary Note 23, further comprising:

updating policies of at least one of UE access and PDU Session selection with the information; and determining at least one of whether maintaining at least one existing PDU session and establishing at least one new PDU session.

(Supplementary Note 25)

The control method according to Supplementary Note 24, wherein the determining is performed by determining whether ongoing traffic are routed over the at least one existing PDU session belonging to other Network Slice than the UE currently uses.

(Supplementary Note 26)

The control method according to Supplementary Note 24, wherein the determining is performed by determining to establish the at least one new PDU session associated with same Network Slice as the UE currently uses or other Network Slice.

(Supplementary Note 27)

The control method according to Supplementary Note 24, wherein the determining is performed by determining to release the at least one existing PDU session associated with same Network Slice as the UE currently uses or other Network Slice.

This application is based upon and claims the benefit of priority from European patent application No. 17196037.0, filed on Oct. 11, 2017, the disclosure of which is incorporated herein in its entirely by reference.

DESCRIPTION OF REFERENCE NUMERALS

1 Telecommunication System
3 Mobile Device
31 Transceiver Circuit
32 Antenna
33 Controller
34 Memory
341 Operating System
342 Communication Control Module
3421 Transceiver Control Module
35 User Interface
5 Base Station
7 Core Network
9 Access and Mobility Management Function (AMF)
91 Transceiver Circuit
92 Controller
93 Memory
931 Operating System
932 Communication Control Module
9321 Transceiver Control Module
94 Network Interface
10 Policy Control Function (PCF)
101 Transceiver Circuit
102 Controller
103 Memory
1031 Operating System
1032 Communication Control Module
10321 Transceiver Control Module
104 Network Interface
11 Unified Data Repository (UDR)
111 Transceiver Circuit
112 Controller
113 Memory
1131 Operating System
1132 Communication Control Module
11321 Transceiver Control Module
114 Network Interface
12 gateways (GW)
13 Authentication and Security Function (AUSF)
20 External IP Network
300 policy control function (PCF) node
301 Transmitting means
400 Access and Mobility Management Function (AMF) node
401 Receiving means
402 Transmitting means
500 User Equipment (UE)
501 receiving means

The invention claimed is:

1. A policy control function (PCF) node, comprising:
a memory storing instructions; and
at least one processor configured to process the instructions to:
  determine to update a Network Slice Selection Policy (NSSP) based on a change in subscriber data related to a Single-Network Slice Selection Assistance Information (S-NSSAI) of a User Equipment (UE), and
  transmit an updated NSSP to the UE via an Access and Mobility Management Function (AMF) node at a UE configuration update procedure.

2. The PCF node according to claim 1, wherein
the PCF node is in a home Public Land Mobile Network (HPLMN) of the UE,
the at least one processor is configured to process the instructions to:
  receive a Nudr_Notify message including an updated subscriber data related to the S-NSSAI of the UE, from a Unified Data Repository (UDR) node;
  determine to update the NSSP based on the updated subscriber data related to the S-NSSAI of the UE; and
  transmit a Npcf_Policy_Control_UpdateNotify message including the updated NSSP to the UE via a PCF node in a visited Public Land Mobile Network (VPLMN) of the UE and the AMF node in a case where the UE is roaming to the VPLMN, and
the UE configuration update procedure is between the UE and the AMF node and is triggered by the PCF node in the VPLMN.

3. The PCF node according to claim 1, wherein
the subscriber data related to the S-NSSAI of the UE is subscribed S-NSSAI of the UE.

4. An Access and Mobility Management Function (AMF) node, comprising:
a memory storing instructions; and
at least one processor configured to process the instructions to:
  receive an updated Network Slice Selection Policy (NSSP), from a policy control function (PCF) node, at a User Equipment (UE) configuration update procedure, in a case where the PCF node determines to update an NSSP based on a change in subscriber data related to a Single-Network Slice Selection Assistance Information (S-NSSAI) of the UE, and transmit the updated NSSP to a UE.

5. The AMF node according to claim 4, wherein the at least one processor is configured to process the instructions to transmit the updated NSSP in a case that the UE is in a connected mode.

6. The AMF node according to claim 4, wherein the at least one processor is configured to process the instructions to trigger a Network Triggered Service Request in a case that the UE is in an idle mode.

7. The AMF node according to claim 4, wherein
the PCF node is a home Public Land Mobile Network (HPLMN) of the UE,
the at least one processor is configured to process the instructions to receive a Npcf_Policy_Control_UpdateNotify message including the updated NSSP via a PCF node in a visited Public Land Mobile Network (VPLMN) of the UE, in a case where the UE is roaming to the VPLMN, and
the UE configuration update procedure is between the UE and the AMF node and is triggered by the PCF node in the VPLMN.

8. A User Equipment (UE) comprising:
a memory storing instructions; and
at least one processor configured to process the instructions to:
receive an updated Network Slice Selection Policy (NSSP), from a policy control function (PCF) node via an Access and Mobility Management Function (AMF) node at a UE configuration update procedure, in a case where the PCF node determines to update an NSSP based on a change in subscriber data related to a Single-Network Slice Selection Assistance Information (S-NSSAI) of the UE.

9. The UE according to claim 8, wherein the at least one processor is configured to process the instructions to:
update policies on the UE with the updated NSSP, and
determine to release at least one existing PDU session based on the updated policies on the UE.

10. The UE according to claim 8, wherein
the PCF node is a home Public Land Mobile Network (HPLMN) of the UE,
the at least one processor is configured to process the instructions to receive a Npcf_Policy_Control_UpdateNotify message including the updated NSSP via a PCF node in a visited Public Land Mobile Network (VPLMN) of the UE and the AMF node, in a case where the UE is roaming to the VPLMN, and
the UE configuration update procedure is between the UE and the AMF node and is triggered by the PCF node in the VPLMN.

11. A mobile communication system, comprising:
an Access and Mobility Management Function (AMF) node;
a Policy Control Function (PCF) node; and
a User Equipment (UE), wherein
the PCF node is configured to:
determine to update a Network Slice Selection Policy (NSSP) based on a change in subscribed Single-Network Slice Selection Assistance Information (S-NSSAI) of the UE, and
transmit an updated NSSP, to the UE via the AMF node, at a UE configuration update procedure,
the UE is configured to receive the updated NSSP for updating policies on the UE, from the PCF node via the AMF node,
the AMF node is configured to:
receive the updated NSSP from the PCF node; and
transmit the updated NSSP to the UE.

12. A control method in a policy control function (PCF) node, comprising:
determining to update a Network Slice Selection Policy (NSSP) based on a change in subscribed Single-Network Slice Selection Assistance Information (S-NSSAI) of a User Equipment (UE); and
transmitting an updated NSSP, to the UE via an Access and Mobility Management Function (AMF) node, at a UE configuration update procedure.

13. The control method according to claim 12, wherein
the PCF node is in a home Public Land Mobile Network (HPLMN) of the UE,
the control method further comprises:
receiving a Nudr_Notify message including an updated subscriber data related to the S-NSSAI of the UE, from a Unified Data Repository (UDR) node;
determining to update the NSSP based on the updated subscriber data related to the S-NSSAI of the UE; and
transmitting a Npcf_Policy_Control_UpdateNotify message including the updated NSSP to the UE via a PCF node in a visited Public Land Mobile Network (VPLMN) of the UE and the AMF node in a case where the UE is roaming to the VPLMN, and
the UE configuration update procedure is between the UE and the AMF node and is triggered by the PCF node in the VPLMN.

14. A control method in an Access and Mobility Management Function (AMF) node, comprising:
receiving an updated Network Slice Selection Policy (NSSP), from a policy control function (PCF) node, at a User Equipment (UE) configuration update procedure, in a case where the PCF node determines to update an NSSP based on a change in subscriber data related to a Single-Network Slice Selection Assistance Information (S-NSSAI) of the UE; and
transmitting the updated NSSP to a UE.

15. The control method according to claim 14, wherein the updated NSSP is transmitted in a case that the UE is in a connected mode.

16. The control method according to claim 14, further comprising triggering a Network Triggered Service Request in a case that the UE is in an idle mode.

17. The control method according to claim 14, wherein
the PCF node is a home Public Land Mobile Network (HPLMN) of the UE,
the control method further comprises receiving a Npcf_Policy_Control_UpdateNotify message including the updated NSSP via a PCF node in a visited Public Land Mobile Network (VPLMN) of the UE, in a case where the UE is roaming to the VPLMN, and
the UE configuration update procedure is between the UE and the AMF node and is triggered by the PCF node in the VPLMN.

18. A control method in a User Equipment (UE), comprising
receiving an updated Network Slice Selection Policy (NSSP), from a policy control function (PCF) node via an Access and Mobility Management Function (AMF) node, at a UE configuration update procedure, in a case where the PCF node determines to update an NSSP based on a change in subscriber data related to a Single-Network Slice Selection Assistance Information (S-NSSAI) of the UE.

19. The control method according to claim 18, further comprising:
updating policies on the UE with the updated NSSP; and
determining to release at least one existing PDU session based on the updated policies on the UE.

20. The control method according to claim 18, wherein the PCF node is a home Public Land Mobile Network (HPLMN) of the UE,
the control method further comprises receiving a Npcf_Policy_Control_UpdateNotify message including the updated NSSP via a PCF node in a visited Public Land Mobile Network (VPLMN) of the UE and the AMF node, in a case where the UE is roaming to the VPLMN, and
the UE configuration update procedure is between the UE and the AMF node and is triggered by the PCF node in the VPLMN.

* * * * *